United States Patent
Koga et al.

(10) Patent No.: US 12,031,312 B2
(45) Date of Patent: Jul. 9, 2024

(54) SANITARY WARE

(71) Applicant: TOTO LTD., Kitakyushu (JP)

(72) Inventors: Naoki Koga, Kitakyushu (JP); Satoru Kitazaki, Kitakyushu (JP); Hiroyuki Kameshige, Kitakyushu (JP); Yuki Okayasu, Kitakyushu (JP); Tomofumi Ano, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 649 days.

(21) Appl. No.: 17/214,225

(22) Filed: Mar. 26, 2021

(65) Prior Publication Data

US 2021/0301514 A1 Sep. 30, 2021

Related U.S. Application Data

(63) Continuation of application No. PCT/JP2021/007684, filed on Mar. 1, 2021.

(30) Foreign Application Priority Data

Mar. 31, 2020 (JP) ................. 2020-064498

(51) Int. Cl.
*C03C 8/02* (2006.01)
*E03D 11/02* (2006.01)
*E03D 11/13* (2006.01)
*E03D 13/00* (2006.01)

(52) U.S. Cl.
CPC ............... *E03D 11/13* (2013.01); *C03C 8/02* (2013.01); *E03D 11/02* (2013.01); *E03D 13/00* (2013.01)

(58) Field of Classification Search
None
See application file for complete search history.

(56) References Cited

U.S. PATENT DOCUMENTS

| | | | |
|---|---|---|---|
| 6,242,117 B1 | 6/2001 | Koga et al. | |
| 6,737,166 B2 | 5/2004 | Koga et al. | |
| 2003/0124359 A1 | 7/2003 | Koga et al. | |
| 2017/0072384 A1* | 3/2017 | Hino | C04B 41/52 |

FOREIGN PATENT DOCUMENTS

| | | |
|---|---|---|
| JP | H04-2679 A | 1/1992 |
| JP | 2000-319061 A | 11/2000 |
| JP | 2000-325917 A | 11/2000 |
| JP | 2001-287981 A | 10/2001 |
| JP | 2001-348263 A | 12/2001 |
| JP | 2002-068821 A | 3/2002 |
| JP | 2002-068825 A | 3/2002 |
| JP | 2002-080266 A | 3/2002 |
| JP | 2002-097068 A | 4/2002 |
| JP | 2002-114565 A | 4/2002 |
| JP | 2002-114566 A | 4/2002 |
| JP | 2002-255630 A | 9/2002 |
| JP | 2019-171311 A | 10/2019 |
| WO | 97/26223 A1 | 7/1997 |
| WO | 99/61392 A1 | 12/1999 |
| WO | 2019/067436 A1 | 4/2019 |

OTHER PUBLICATIONS

International Search Report from International Application PCT/JP2021/007684, of which this application is a continuation bypass.
Office Action issued in the corresponding Japanese Patent Application No. 2021-517078 with a mailing date of Jul. 12, 2022.

* cited by examiner

*Primary Examiner* — Humera N. Sheikh
*Assistant Examiner* — Kim S. Horger
(74) *Attorney, Agent, or Firm* — Carrier, Shende & Associates P.C.; Fulchand P. Shende; Joseph P. Carrier

(57) ABSTRACT

Disclosed is a sanitary ware compatibly satisfying both low water absorption and weight reduction. The sanitary ware has a pottery substrate of a vitreous body and a glaze layer, in which part of the substrate is exposed to outside thereof without the glaze layer; the substrate has (A) an anorthite and (B) an alkali metal component; and an amount of the alkali metal component is in the range of 5 to 10% by weight in terms of an oxide conversion ($A_2O$) relative to the substrate. This sanitary ware has the properties of low water absorption and light weight.

6 Claims, No Drawings

SANITARY WARE

CROSS-REFERENCE TO RELATED APPLICATIONS

This is a continuation application of International Application PCT/JP2021/007684, filed on Mar. 1, 2021. This application also claims priority to Japanese Application No. 2020-064498, filed on Mar. 31, 2020. The entire contents of each of these prior applications are incorporated herein by reference.

TECHNICAL FIELD

The present invention relates to a sanitary ware to be used such as toilet bowls and wash bowls.

BACKGROUND ART

Sanitary wares are much heavier than tableware, and, therefore, when a highly vitreous porcelain is used, it causes significant deformation due to its own weight during firing, so that the production thereof would be difficult. On the other hand, when pottery that is less vitreous and more crystalline is used, the portion not applied with a glaze absorbs water so that this may cause problems such as absorption of filthy water and breakage due to freezing. Therefore, the sanitary ware uses, as the pottery substrate, a vitreous body that is somewhere between porcelain and pottery so as to suppress deformation during firing and to reduce water absorption as much as possible.

Therefore, the sanitary wares, nowadays, generally have a structure having a pottery substrate of a vitreous body and a glaze layer, in which the glaze layer is formed on most of the vitreous body with part of the vitreous body being exposed. For example, the toilet bowl having this structure not only has sufficient strength hardly causing deformation with the load due to sitting thereon but also is resistant to be scarred on its surface thereby retaining the sanitary property thereof. Furthermore, since the pottery substrate of the vitreous body is densified thereby reducing water absorption as much possible, the problems due to water absorption in the exposed portion thereof can be prevented.

As the sanitary wares are comparatively large among ceramic products and have a complex shape, they have a thick structure in order to keep the product strength thereof. In the conventional substrate, the flexural strength thereof is 50 to 80 MPa; with this strength, the thickness of the product needs to be about 7 to 12 mm, resulting in increase in the product weight. Therefore, a further lighter sanitary ware has been still wanted in transportation, construction, and increase in the size thereof.

Therefore, proposals have been made with regard to the technology that can lower the product's weight with lowering the water absorption while keeping the flexural strength even more than ever.

For example, in JP 2000-319061 (Patent Literature 1), the ceramics having a substrate and a glaze layer formed on the necessary portion of the substrate is disclosed in which a center portion of the substrate is formed of an water-absorptive pottery substrate, and at least a portion not covered with the glaze layer on the substrate surface is fired after the molded article thereof is impregnated with an alkali metal or alkali earth metal component in such a way as to have a lower water absorption than the center portion of the substrate.

In JP 2002-68821 A (Patent Literature 2), the ware having a ceramic substrate and a glaze layer formed on a necessary portion of the substrate is disclosed in which, relative to the total substrate as 100, the substrate includes, as the main components thereof, $SiO_2$ in the range of 50 to 75% by weight, $Al_2O_3$ in the range of 20 to 45% by weight, and $Na_2O$ in the range of 0.5% or greater by weight; the sum of at least one component selected from the group consisting of $Na_2O$, $Li_2O$, and $K_2O$ and at least one component selected from the group consisting of CaO, MgO, BaO, and BeO is in the range of 2 to 6% by weight; and the substrate further includes at least one or more crystals selected from the group consisting of quartz, cristobalite, mullite, and corundum with the total crystals amount being in the range of 10 to 60% by weight.

In JP 2001-348263 A (Patent Literature 3), the sanitary ware having a ceramic substrate and a glaze layer that is formed on a necessary portion of the substrate is disclosed in which the substrate includes a crystal phase mainly composed of mullite and quartz, a glass phase mainly composed of $SiO_2$ and $Al_2O_3$, and as necessary, a crystal phase formed of a mineral selected from cristobalite, andalusite, sirimanite, kyanite, and corundum. Here, the main components of the substrate are $SiO_2$ in the range of 50 to 65% by weight, $Al_2O_3$ in the range of 30 to 45% by weight, an alkali metal oxide in the range of 0.1 to 2% by weight, and a divalent metal oxide in the range of 0.1 to 10% by weight. And the divalent metal oxide component includes at least a CaO component, in which a CaO-segregated portion having the CaO component segregated therein is scattered in the substrate.

In JP 2002-68825 A (Patent Literature 4), the ceramics having the following characteristic is disclosed. Namely, the substrate for sanitary ware is the one that can be manufactured by a method comprising, a casting step of casting a ceramic raw material to obtain a molded substrate, a glazing step of glazing a necessary portion if necessary, and a firing step. Here, the ceramic raw material includes: a raw material of a reinforcing filler forming material represented by pottery stone, silica stone, pirophylite, chamotte, van ash shale, or kaolin; a plasticity raw material represented by a GAEROME clay, a KIBUSHI clay, or a kaolin; a calcium raw material represented by wollastonite, limestone, or anorthite; and optionally, a sintering adjuvant raw material represented by feldspar or dolomite. In this substrate, the filling rate of the molded substrate in the casting step is 68% or greater by volume; the composition of the main components of the substrate is 45-70% by weight of $SiO_2$ and 25-50% by weight of $Al_2O_3$. Further, the substrate includes other constituent components including at least one alkali metal oxide selected from the group consisting of $Na_2O$, $K_2O$, and $Li_2O$ and/or at least one alkali earth metal oxide selected from the group consisting of CaO, MgO, BaO, and BeO, in which a total amount of at least one alkali metal oxide selected from the group consisting of $Na_2O$, $K_2O$, and $Li_2O$ is 2% or less by weight, and a total amount of at least one alkali metal oxide selected from the group consisting of $Na_2O$, $K_2O$, and $Li_2O$ and at least one alkali earth metal oxide selected from the group consisting of CaO, MgO, BaO, and BeO is 10% or less by weight; and the alkali earth metal oxide component contains at least a CaO component.

In WO 1997/26223 A (Patent Literature 5), the ceramic substrate is disclosed in which the ceramic substrate is formed of a crystal phase and a glass phase; the glass phase includes an alkali metal oxide and an alkali earth metal oxide; and a mole ratio of the alkali earth metal oxide to a total of the alkali metal oxide and the alkali earth metal oxide is 30% or greater by mole.

In this technology, the deformation amount by firing, is reduced, but the low water absorption and the weight reduction were incompatible.

In JP 2001-287981 A (Patent Literature 6), the sanitary ware having a ceramic substrate and a glaze layer that is formed on a necessary portion of the substrate is disclosed in which the composition of the main component constituting the substrate is 45-70% by weight of $SiO_2$ and 25-50% by weight of $Al_2O_3$; the substrate contains an alkali metal oxide and at least one alkali earth metal oxide selected from the group consisting of CaO, MgO, BaO, and BeO in the range of 6% or less by weight as a total; the amount of alkali metal oxide in the substrate is 2% or less by weight; $Na_2O$ is contained as an essential component of the alkali metal oxide, and $K_2O$ as an arbitrary component; and an amount of $Na_2O$ relative to a total amount of $Na_2O$ and $K_2O$ is 20% or greater by weight.

In JP 2002-255630 A (Patent Literature 7), the sanitary ware having a ceramic substrate and a glaze layer that is formed on a necessary portion of the substrate is disclosed in which the composition of the main component constituting the substrate is 45 to 70% by weight of $SiO_2$ and 25 to 50% by weight of $Al_2O_3$; the substrate contains an alkali metal oxide and an alkali earth metal oxide in an amount of 10% or less by weight as a total; the amount of the alkali metal oxide in the substrate is 2% or less by weight; CaO and MgO are contained as essential components of the alkali earth metal oxide; and MgO relative to a total amount of CaO and MgO is 20% or greater by weight.

In JP 2002-80266 A (Patent Literature 8), the sanitary ware having a ceramic substrate and a glaze layer that is formed on a necessary portion of the substrate is disclosed in which the substrate is formed of a crystal phase mainly containing mullite and quartz, a glass phase mainly containing $SiO_2$ and $Al_2O_3$, and if necessary, a crystal phase containing a mineral selected from cristobalite, andalusite, sillanite, karayite and corundum; the main components of the substrate are SiO2 in the range of 50 to 65% by weight, $Al_2O_3$ in the range of 30 to 45% by weight, an alkali metal oxide in the range of 0.1 to 2% by weight, and a divalent metal oxide in the range of 0.1 to 10% by weight; the divalent metal oxide contains at least a CaO component; a CaO-segregated portion having the CaO component segregated therein is scattered in the substrate; and a fibrous wollastonite having an aspect ratio of 10 or greater is used as the raw material of the substrate.

In JP 2002-80266 A (Patent Literature 9), the lightweight pottery is disclosed in which
  a sintered substrate consists of a crystal phase mainly containing mullite, quartz, and anorthite and a glass phase mainly containing $SiO_2$ and $Al_2O_3$; a large number of independent pores surrounded by an anorthite are formed in the sintered substrate; and a bulk density thereof is in the range of 2.0 to 2.4 g/cm$^3$.

Further, in JP 2002-97068 A (Patent Literature 10), JP 2002-114565 A (Patent Literature 11), and JP 2002-114566 A (Patent Literature 12), the sanitary wares whose product weights are reduced while keeping the flexural strengths are disclosed.

On the other hand, the glaze that is described, for example, in WO 1999/61392 A (Patent Literature 13) is used as the glaze for the sanitary ware.

CITATION LIST

Patent Literature

Patent Literature 1: JP 2000-319061 A
Patent Literature 2: JP 2002-68821 A
Patent Literature 3: JP 2001-348263 A
Patent Literature 4: JP 2002-68825 A
Patent Literature 5: WO 1997/26223 A
Patent Literature 6: JP 2001-287981 A
Patent Literature 7: JP 2002-255630 A
Patent Literature 8: JP 2002-80266 A
Patent Literature 9: JP 2002-80266 A
Patent Literature 10: JP 2002-97068 A
Patent Literature 11: JP 2002-114565 A
Patent Literature 12: JP 2002-114566 A
Patent Literature 13: WO 1999/61392 A
Patent Literature 14: JP H04-2679 A

SUMMARY OF THE INVENTION

Technical Problems

Concerning sanitary wares, the technology is still needed, with which the product weight thereof can be reduced while keeping the low water absorption and the strength thereof.

An object of the present invention is to provide the sanitary ware that can satisfy both the low water absorption and the lightness.

Solution to Problems

We have found that the sanitary ware that can satisfy both the low water absorption and the lightness could be realized by the composition that had been considered inappropriate as the composition for the sanitary ware from heretofore knowledges in the vitreous body. The present invention is based on such findings.

Thus, a sanitary ware according to the present invention comprises
  a pottery substrate of a vitreous body and a glaze layer, wherein a part of the substrate is exposed to outside thereof without the glaze layer;
  the substrate comprising:
  (A) an anorthite and
  (B) an alkali metal component; and
  where an amount of the alkali metal component is in the range of 5 to 10% by weight in terms of an oxide conversion ($A_2O$) relative to the substrate.

DESCRIPTION OF THE EMBODIMENTS

Sanitary Ware and Substrate

In this disclosure, a "sanitary ware" means a toilet and a washbowl, as well as pottery products that are used around them, specifically, a closet bowl, a urinal, a tank, a perforate plate, a washbowl, a hand washer, and the like. The sanitary ware according to the present invention is the pottery whose material is described in "7.1 Kinds of Materials" of JIS A5207:2019, and is preferably the one that satisfies the properties described in "7.2 Quality of Pottery".

In the sanitary ware according to the present invention, the substrate thereof is basically a pottery substrate of a vitreous body. In this disclosure, the term "pottery substrate of a vitreous body" means usual meaning that is understood by those skilled in the art with regard to the sanitary ware; thus, "pottery substrate of a vitreous body" as the substrate of the sanitary ware according to the present invention can be understood with a usual meaning except for the characteristics given by the present invention to be described later.

The "pottery substrate of a vitreous body" in the sanitary ware according to the present invention includes (A) an anorthite and (B) an alkali metal component, in which an amount of the alkali metal component is in the range of 5 to 10% by weight in terms of an oxide conversion ($A_2O$) relative to the substrate, preferably in the range of 6 to 10% by weight. Here, the alkali metal component is preferably Li, Na, and K. Therefore, the oxides thereof are $Li_2O$, $Na_2O$, and $K_2O$.

According to heretofore knowledge, in a large pottery product such as the sanitary ware, the alkali metal component within the range described above is disadvantageous in view of the product's strength, deformation thereof during firing, and the like; therefore, this amount is usually understood to be improper. However, the substrate containing the alkali metal component whose amount is considered to be too much as described above could bring about, upon coexisting with (A) the anorthite therein, a low water-absorption and a high strength, so that reduction of the product's weight could be accomplished.

According to a preferred embodiment of the present invention, the substrate of the sanitary ware according to the present invention is further characterized by the closed pore therein. In this specification, the term "closed pore" means a pore present inside the substrate that is not connected to an outside air. In addition, according to a preferred embodiment of the present invention, the closed pore rate that is obtained by the measurement method of the "closed pore rate" to be described later is determined 15% or greater by volume.

According to a preferred embodiment of the present invention, the substrate of the sanitary ware according to the present invention is characterized also by water absorption rate thereof. In this specification, this water absorption rate that is obtained by the measurement method of the "water absorption rate" to be described later is determined less than 2%.

In the present invention, the reason for realization of low water absorption and weight reduction in the sanitary ware is not clear yet; but the following theory may be presumed. However, this theory is a hypothesis; thus, the present invention is not limited by this theory.

One theory is that the pore generated in the substrate upon forming the anorthite at 900 to 1000° C. is kept until the maximum firing temperature; then, this open pore could be closed, as described below.

As the temperature of the vitreous body including a kaolin is raised, firstly a metakaolin is formed by dehydration reaction of the kaolin. When a limestone is blended as one raw material of the substrate, the reaction between the metakaolin and the limestone takes place at 900 to 1000° C. to generate an anorthite ($CaAl_2Si_2O_8$).

$$Al_2O_3 \cdot 2SiO_2 + CaCO_3 \rightarrow CaAl_2Si_2O_8 + CO_2 \qquad (1)$$

In this reaction, the portion where the limestone is consumed turns to a pore; then, the anorthite is formed around the pore.

In the case of a usual sanitary ware substrate, the metakaolin decomposes at 1000° C. or higher to generate a mullite and a $SiO_2$ glass. There is a possibility that the amount of the closed pore is decreased by this amount and that a flux component at the maximum temperature increases.

$$3(Al_2O_3 \cdot 2SiO_2) \rightarrow 3Al_2O_3 \cdot 2SiO_2 + 4SiO_2 \qquad (2)$$

However, the reaction formula (2) does not occur, because the metakaolin is consumed by the anorthite-forming reaction (reaction formula (1)) that takes place at lower temperature during temperature rising. Therefore, it is presumed that the mullite and the $SiO_2$ glass does not formed, and that the pores formed by the anorthite-forming reaction can readily remain as they are.

Then, the pore amount may be maximized until the maximum firing temperature of 1100 to 1200° C. at which the viterification reaction takes place; then, the viscosity of a small amount of the glass is lowered owing to the higher content of the alkali metal component, thereby leading to increase of the fluidity thereof resulting in the enclosure of the open pores. As a result, not only the open pores are closed but also many closed pores remain, so that excellent low water absorption and weight reduction are realized.

In place of limestone, a calcium (Ca)-containing raw material such as wollastonite may be used as the raw material capable of contributing to formation of anorthite. In the present invention, the raw material containing calcium is at least one selected from the group consisting of limestone, wollastonite, dolomite, and apatite, while this is preferably any one of limestone and wollastonite, or both. These calcium-containing raw materials react with metakaolin ($Al_2O_3 \cdot 2SiO_2$) at 900 to 1000° C. to form anorthite.

When wollastonite is used as the calcium-containing raw material, it is presumed that anorthite is formed according to the following reaction (reaction formula (3)).

$$Al_2O_3 \cdot 2SiO_2 + CaSiO_3 \rightarrow CaAl_2Si_2O_8 + SiO_2 \qquad (3)$$

Because a $CO_2$ gas is not generated in the reaction of the anorthite-forming reaction formula (3), pores are not increased; thus, the density change in the firing process is small. In addition, because the $SiO_2$ glass is formed excessively in the reaction according to the reaction formula (3), this excess $SiO_2$ glass, together with the glass that is going to be formed by the viterification reaction thereafter, contributes to enclosure of the open pores. That is, when wollastonite is used as the calcium-containing raw material, the amount of the closed pore in the substrate after firing decreases as compared with the case that limestone is used; but this has a merit in that the deformation due to firing can be lowered.

According to a preferred embodiment of the present invention, the amount of anorthite in the substrate is preferably in the range of 10 to 45% by weight, while more preferably in the range of 13 to 31% by weight. The amount of the anorthite can be obtained in such a way that the Rietveld analysis is done to the X-ray diffraction pattern obtained by the powder analysis method to determine the scale coefficient, from which the existing amounts of each crystal phase can be estimated. The detailed quantification method of anorthite is described in Example to be described later.

According to a preferred embodiment of the present invention, the amount of the alkali metal component in terms of the oxide conversion relative to the substrate is in the range of 5 to 10% by weight, while more preferably in the range of 6 to 9% by weight. The closed pore rate is preferably in the range of 20% to 31% by volume, and the water absorption rate is preferably less than 1%.

According to a preferred embodiment of the present invention, the sanitary ware substrate contains calcium, in terms of the oxide conversion (CaO), in the range of 3 to 10% by weight, while preferably in the range of 4 to 9% by weight.

(C) Component: Aggregate

The sanitary ware substrate according to the present invention may contain an aggregate component in view of the strength thereof. The aggregate component usable herein may be usually the one that is added to the pottery substrate of the vitreous body, and that does not undergo the reaction during firing, and that can suppress shrinkage during firing or deformation due to softening or can have an effect to the strength of the fired body.

According to a preferred embodiment of the present invention, the aggregate component, namely the (C) component, contains preferably at least one aggregate selected from the group consisting of corundum, chamotte, quartz, hollow silica, hollow alumina, zirconia, zircon, cordierite, and mullite.

In the present invention, the use of the aggregate component may bring about following merits. That is, when metakaolin is consumed in the anorthite-forming reaction (reaction formula (1)) thereby producing comparatively large amount of anorthite, there is a possibility to cause significant shrinkage within this reaction temperature range. This shrinkage impairs matching with the glaze. Then, it was found that these aggregates described above did not involve in the reaction formula (1) and that they were the materials that suppress the increase in the flux component in the viterification reaction. Therefore, the use of these aggregates is advantageous from a viewpoint to lower water-absorption and weight. In addition, according to a preferred embodiment of the present invention, the use of these aggregates can bring about the sanitary ware that is excellent in the thermal shock resistance.

In the present invention, the shape and composition of the aggregate component can be identified by the reflection electron image of the polished surface of the sanitary ware obtained by the scanning electron microscope (SEM) and by the element mapping of the energy-dispersion type X-ray analysis (EDX).

Raw Materials and Composition of Sanitary Ware Substrate

The raw materials of the sanitary ware substrate may be prepared from heretofore known raw materials with considering the composition thereof. Specifically, illustrative examples of the raw material include silica sand, feldspar, limestone, wollastonite, clay, alumina, and chamotte. The composition of the sanitary ware substrate according to the present invention is preferably as those described below; thus, raw materials of the pottery substrate are blended so as to give the following composition.

$SiO_2$ 40 to 65 parts by weight
$Al_2O_3$ 20 to 50 parts by weight
$CaO$ 3 to 10 parts by weight
$MgO$ 0.1 to 1 parts by weight
$K_2O$ 3 to 6 parts by weight
$Na_2O$ 0.5 to 5 parts by weight
$Li_2O$ 0 to 2 parts by weight Glaze Layer The glaze layer of the sanitary ware according to the present invention is not particularly restricted; although according to a preferred embodiment of the present invention, the composition of the glaze layer is preferably those described below in terms of the oxide conversion.

$SiO_2$ 55 to 80 parts by weight
$Al_2O_3$ 5 to 13 parts by weight
$Fe_2O_3$ 0.1 to 0.4 parts by weight
$CaO$ 8 to 17 parts by weight
$MgO$ 0.8 to 3.0 parts by weight
$ZnO$ 3 to 8 parts by weight
$K_2O$ 1 to 4 parts by weight
$Na_2O$ 0.5 to 2.5 parts by weight
$ZrO_2$ 0 to 15 parts by weight
Pigment 0 to 20 parts by weight The raw materials of the glaze layer may be prepared from heretofore known raw materials with considering the composition thereof. Illustrative examples thereof include silica sand, feldspar, limestone, dolomite, alumina, zinc oxide, and zircon.

According to a preferred embodiment of the present invention, the sanitary ware substrate and the glaze layer are preferably the combination that does not show a big difference in the deformation amount between the substrate and the glaze layer after firing, and that does not adversely affect the shape or the surface state of the sanitary ware after firing.

In the combination, for example, matching with the glaze in Example to be described later is preferably within 5 mm in terms of deformation amount. According to another embodiment of the present invention, the linear thermal expansion coefficient of the substrate is preferably about $5\times10^{-7}$/K to $10\times10^{-7}$/K higher than that of the graze.

Production of Sanitary Ware

The sanitary ware according to the present invention may be produced in such a way that the slip prepared from the afore-mentioned substrate raw materials is molded in a mold made of plaster or the like by slip casting to obtain a molded article, followed by drying, applied with the glaze, and then firing. In the present invention, as described above, the pore formed during formation of the anorthite is kept until the maximum firing temperature; then, the open pore is closed thereby realizing superior low water absorption, strength, and weight reduction. Accordingly, it is preferable to determine the firing condition such that the reaction and phenomena mentioned above can be surely realized. According to one aspect of the present invention, preferably the firing is carried out with the temperature raising rate of about 200° C./hour; then, the temperature is kept at the maximum temperature of 1180 to 1200° C. for 2 hours.

"Closed pore rate" and "water absorption rate" defined in the present invention are measured by the methods described below.

Water Absorption Rate

The fired body that is molded or cut out to the size of 7 mm×8 mm×70 mm is prepared as the measurement sample. This sample is dried at 110° C. for 24 hours; then, the weight of the sample is measured to obtain the dry weight thereof. Then, the sample is placed in a vessel; then, this is degassed by a vacuum pump for 20 minutes. With keeping the vacuum condition, distilled water is charged into the vessel in which the sample is placed; then, this is degassed for further 60 minutes. The vessel is opened to an atmospheric air; then, the sample is dipped into water and pulled up from water. The water on the surface is wiped off with a cloth or the like to measure the weight thereof. This is taken as the weight at the time of water absorption. The water absorption rate is calculated by the following calculation formula.

$$\text{Water absorption rate} = \frac{\text{absorbed water weight} - \text{dry weight}}{\text{dry weight}} \times 100$$

Closed Pore Rate

By using the values to obtain the water absorption rate, the apparent density is obtained from the following formula.

$$\text{Apparent density} = \text{Specific gravity of water} \times \frac{\text{dry weight}}{\text{dry weight} - \text{absorbed water weight}}$$

9

Further, "true density" was measured as follows. Namely, the fired substrate body was crushed to the degree not including the closed pore; then, the density of the powder thereby obtained was measured by using a specific gravity vial using water as the solvent. This is defined as "true density" of the substrate.

From the apparent density and the true density, the closed pore rate can be defined by the following formula.

$$\text{Closed pore rate} = \left(1 - \frac{\text{apparent density}}{\text{true density}}\right) \times 100$$

10

EXAMPLES

The present invention will be explained in more detail by Examples described below; but the present invention is not limited to these Examples.

Production of Sanitary Ware

Raw Material

The raw materials described in Table 1 below were prepared; then, they were mixed in accordance with the combination described in Table 2 so as to give the composition described in Table 3. Then, they were crushed if necessary with a ball mill or the like to obtain the raw material of the sanitary ware substrate.

TABLE 1

| Raw material | $SiO_2$ | $Al_2O_3$ | $TiO_2$ | $Fe_2O_3$ | CaO | MgO | $K_2O$ | $Na_2O$ | $Li_2O$ | $ZrO_2$ |
|---|---|---|---|---|---|---|---|---|---|---|
| China stone | 75 | 18.1 | 0.13 | 0.38 | 0.17 | 0.02 | 0.17 | — | — | — |
| Kaolin | 48.1 | 36.4 | 0.2 | 0.8 | 0.2 | 0.3 | 2.2 | 0.1 | — | — |
| Sericite | 46.69 | 37.56 | 0.63 | 0.35 | 0.31 | 0.18 | 8.3 | 1.14 | — | — |
| Feldspar A | 56.1 | 25.2 | 0.2 | 0.1 | 1.1 | — | 8.8 | 7.7 | — | — |
| Feldspar B | 67.51 | 17.82 | — | 0.13 | 0.18 | 0.02 | 10.95 | 3.03 | — | — |
| Feldspar C | 60.4 | 23.31 | — | 0.07 | 0.34 | — | 5.03 | 10.36 | — | — |
| Petalite | 75.49 | 17.52 | 0 | 0.09 | 0.16 | 0.03 | 0.64 | 0.47 | 4.24 | — |
| Limestone | 0.03 | — | — | 0.01 | 55.89 | 0.31 | — | — | — | — |
| Wollastonite | 51.19 | 0.66 | — | 0.31 | 45.07 | 0.62 | — | — | — | — |
| Dolomite | 2.5 | — | — | 0.1 | 32.3 | 19.5 | — | — | — | — |
| Silica sand A | 96.5 | 1.5 | 0.04 | 0.08 | 0.15 | 0.04 | 1.04 | — | — | — |
| Silica sand B | 98.94 | 0.34 | — | 0.03 | 0.01 | 0.01 | 0.3 | 0.09 | — | — |
| Silica sand C | 99.11 | 0.47 | — | 0.02 | 0.04 | 0.03 | 0.12 | 0.06 | — | — |
| Chamotte A | 52.24 | 43.2 | 2.09 | 1.61 | 0.21 | 0.38 | 0.48 | 0.06 | — | — |
| Chamotte B | 53.95 | 42.13 | 0.04 | 1.25 | 0.05 | 0.3 | 2.03 | 0.06 | — | — |
| Chamotte C | 53.95 | 42.13 | 0.04 | 1.25 | 0.05 | 0.3 | 2.03 | 0.06 | — | — |
| Clay A | 53.5 | 29.9 | 1.2 | 1 | 0.3 | 0.4 | 2.1 | 0.2 | — | — |
| Clay B | 48.78 | 34.93 | 0.87 | 1.37 | 0.21 | 0.24 | 0.59 | 0.07 | — | — |
| Clay C | 54.02 | 28.84 | 1.17 | 1.03 | 0.14 | 0.35 | 2.09 | 0.31 | — | — |
| Alumina A | 0.03 | 99.6 | — | 0.02 | — | — | — | 0.34 | — | — |
| Alumina B | 0.03 | 99.9 | — | 0.03 | — | — | — | 0.07 | — | — |
| Alumina C | 0.02 | 99.6 | — | 0.03 | — | — | — | — | — | — |
| Alumina D | 0.02 | 99.7 | — | 0.01 | — | — | — | — | — | — |
| Zirconia | — | — | — | — | — | — | — | — | — | 100 |
| Zircon | 33 | 0.6 | 0.1 | 0.1 | — | — | — | — | — | 66 |
| Cordierite | 49.5 | 36 | 0.3 | 0.3 | 0.2 | 0.2 | 13 | — | — | — |

TABLE 2

| Substrate | | Example 1 | 2 | 3 | 4 | 5 | 6 | 7 | 8 | 9 | 10 | 11 | 12 |
|---|---|---|---|---|---|---|---|---|---|---|---|---|---|
| Used raw material | China stone | | | | | | | | | | | | |
| | Kaolin | | | | | | | | | | | | |
| | Sericite | | | | | | | | | | | | |
| | FeldsparA | | | | | | | | | | | | |
| | FeldsparB | ○ | ○ | ○ | ○ | ○ | ○ | ○ | ○ | ○ | ○ | ○ | ○ |
| | FeldsparC | ○ | ○ | ○ | ○ | ○ | ○ | ○ | ○ | ○ | | ○ | |
| | Petalite | | | | | | | | | | ○ | | ○ |
| | Limestone | ○ | ○ | ○ | ○ | ○ | ○ | ○ | ○ | ○ | ○ | ○ | |
| | Wollastonite | | | | | | | | | | | | ○ |
| | Dolomite | | | | | | | | | | | | ○ |
| | Alumina A | | | ○ | | | | | | | ○ | ○ | |
| | Alumina B | | | | ○ | | | | | | | | |
| | Alumina C | | | | | | | | | | | | ○ |
| | Alumina D | | | | | | | | | | | | |
| | SilicasandA | | | | | | | | | | | | |
| | SilicasandB | | | | | ○ | | | | | | | |
| | SilicasandC | | | | | | ○ | | | | | | |

TABLE 2-continued

|  |  | | | | | | | | | | | |
|---|---|---|---|---|---|---|---|---|---|---|---|---|
|  | ChamotteA |  |  |  |  |  |  |  |  |  |  |  |
|  | ChamotteB |  |  |  |  |  |  | ○ | ○ |  |  |  |
|  | ChamotteC |  |  |  |  |  |  |  |  |  | ○ |  |
|  | Zirconia |  |  |  |  |  |  |  |  |  |  |  |
|  | Zircon |  |  |  |  |  |  |  |  |  |  |  |
|  | Cordierite |  |  |  |  | ○ |  |  |  |  |  |  |
|  | ClayA |  |  |  |  |  |  |  |  |  |  |  |
|  | ClayB | ○ |  | ○ | ○ |  |  | ○ | ○ |  |  |  |
|  | ClayC |  | ○ |  |  |  | ○ |  |  | ○ | ○ | ○ | ○ |
| Main | Corundu | — | — | 10.2 | 20.3 | — | — | — | — | 10.2 | 10.2 | — | 15 |
| aggregate in | Chamott | — | — | — | — | — | — | 10.2 | 20.4 | — | — | 10.2 | — |
| substrate | Quartz | 4.5 | 10 | 3.9 | 2.2 | 8.7 | 19.4 | 3.1 | 2.8 | 8.5 | 9.5 | 8.5 | — |
| raw | Zirconia | — | — | — | — | — | — | — | — | — | — | — | — |
| material | Zircon | — | — | — | — | — | — | — | — | — | — | — | — |
| (wt %) | Cordierit | — | — | — | — | — | — | — | — | — | — | — | — |
|  | Total | 4.5 | 10 | 14.1 | 22.5 | 8.7 | 19.4 | 13.3 | 23.2 | 18.7 | 19.7 | 18.7 | 15 |
| firing temperature (° C.) |  | 1180 | 1180 | 1180 | 1180 | 1180 | 1180 | 1180 | 1180 | 1180 | 1180 | 1180 | 1180 |

|  |  | Example | | | | | | Comparative Example | | | | |
|---|---|---|---|---|---|---|---|---|---|---|---|---|
| Substrate |  | 13 | 14 | 15 | 16 | 17 | 18 | 1 | 2 | 3 | 4 | 5 |
| Used | China stone |  |  |  |  |  |  | ○ |  | ○ |  |  |
| raw | Kaolin |  |  |  |  |  |  | ○ | ○ | ○ |  |  |
| material | Sericite |  |  |  |  |  |  | ○ |  |  |  |  |
|  | FeldsparA |  |  |  |  |  |  | ○ |  | ○ |  |  |
|  | FeldsparB | ○ | ○ | ○ | ○ | ○ | ○ |  |  |  | ○ | ○ |
|  | FeldsparC | ○ | ○ | ○ | ○ | ○ | ○ |  |  |  | ○ | ○ |
|  | Petalite |  |  |  |  |  |  |  |  |  |  |  |
|  | Limestone | ○ |  | ○ |  | ○ | ○ |  |  |  | ○ | ○ |
|  | Wollastonite |  | ○ |  | ○ |  |  |  |  |  |  |  |
|  | Dolomite |  |  |  |  |  |  |  | ○ |  | ○ |  |
|  | Alumina A |  |  |  |  |  |  |  |  |  |  |  |
|  | Alumina B |  |  |  |  |  |  |  |  |  |  |  |
|  | Alumina C |  | ○ |  | ○ |  |  |  |  |  |  |  |
|  | Alumina D |  | ○ |  |  |  |  |  |  |  |  |  |
|  | SilicasandA |  |  |  |  |  |  |  | ○ |  |  |  |
|  | SilicasandB |  |  |  |  |  |  |  |  |  |  |  |
|  | SilicasandC |  | ○ | ○ |  |  |  |  |  |  |  |  |
|  | ChamotteA |  |  |  |  |  |  |  | ○ |  |  |  |
|  | ChamotteB |  |  |  |  |  |  |  |  |  |  |  |
|  | ChamotteC |  |  | ○ |  |  |  |  |  |  | ○ | ○ |
|  | Zirconia | ○ |  |  |  |  |  |  |  |  |  |  |
|  | Zircon |  |  |  |  | ○ |  |  |  |  |  |  |
|  | Cordierite |  |  |  |  |  | ○ |  |  |  |  |  |
|  | ClayA |  |  |  |  |  |  | ○ | ○ | ○ |  |  |
|  | ClayB |  |  |  |  |  |  |  |  |  |  |  |
|  | ClayC | ○ | ○ | ○ | ○ | ○ | ○ |  |  |  | ○ | ○ |
| Main | Corundu | 1 | 17 | — | 20 | — | — | — | — | — | 15.8 | 5.9 |
| aggregate in | Chamott | — | — | 10 | — | — | — | — | 23.2 | — | — | — |
| substrate | Quartz | — | 3 | 5 | — | — | — | 35.6 | 23.5 | 34.9 | 11 | 6.6 |
| raw | Zirconia | 14.6 | — | — | — | — | — | — | — | — | — | — |
| material | Zircon | — | — | — | — | 10.2 | — | — | — | — | — | — |
| (wt %) | Cordierit | — | — | — | — | — | 5.7 | — | — | — | — | — |
|  | Total | 14.6 | 20 | 15 | 20 | 10.2 | 5.7 | 35.6 | 46.7 | 34.9 | 26.8 | 12.5 |
| firing temperature (° C.) |  | 1180 | 1180 | 1180 | 1180 | 1180 | 1180 | 1200 | 1200 | 1180 | 1180 | 1180 |

TABLE 3

|  |  | Example | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| Substrate | $SiO_2$ | 54.8 | 58.5 | 50.2 | 44.7 | 57.4 | 63 | 53.5 | 54.2 | 52.5 | 55.3 | 58.5 | 48.8 |
| Composition | $Al_2O_3$ | 27.1 | 24.4 | 34.8 | 42.3 | 25.4 | 21.8 | 30.1 | 30.7 | 32.5 | 30.9 | 26.1 | 33.4 |
| (wt %) | $Na_2O$ | 3.3 | 3.51 | 3.09 | 2.02 | 3.27 | 3.02 | 2.65 | 2.33 | 3.44 | 1.39 | 3.41 | 1.45 |
|  | $K_2O$ | 4.33 | 5.03 | 4.34 | 5.02 | 4.28 | 4.37 | 4.05 | 3.83 | 4.73 | 5.23 | 4.96 | 3.5 |
|  | $Li_2O$ | 0 | 0 | 0 | 0 | 0 | 0 | 0 | 0 | 0 | 0.41 | 0 | 0.06 |
|  | MgO | 0.17 | 0.22 | 0.14 | 0.13 | 0.16 | 0.2 | 0.2 | 0.27 | 0.17 | 0.17 | 0.21 | 0.35 |
|  | CaO | 9.22 | 7.24 | 6.5 | 5.22 | 8.39 | 6.62 | 8.58 | 7.5 | 5.81 | 5.81 | 5.81 | 5.39 |
|  | $ZrO_2$ | 0 | 0 | 0 | 0 | 0 | 0 | 0 | 0 | 0 | 0 | 0 | 0 |
|  | Others | 1.08 | 1.1 | 0.93 | 0.61 | 1.1 | 0.99 | 0.92 | 1.17 | 0.85 | 0.79 | 1.01 | 7.12 |

TABLE 3-continued

|  |  | Example |  |  |  |  |  | Comparative Example |  |  |  |  |
|---|---|---|---|---|---|---|---|---|---|---|---|---|
|  |  | 13 | 14 | 15 | 16 | 17 | 18 | 1 | 2 | 3 | 4 | 5 |
| Substrate | $SiO_2$ | 44.3 | 52.4 | 60.8 | 49 | 55.7 | 57.78 | 72.5 | 64.1 | 73.5 | 45.1 | 57.6 |
| Composition | $Al_2O_3$ | 18.7 | 35.6 | 24.7 | 38.7 | 21.7 | 25.26 | 19.8 | 32.1 | 18.8 | 39.9 | 27.3 |
| (wt %) | $Na_2O$ | 2.53 | 3.15 | 3.22 | 2.96 | 3.16 | 3.2 | 1.15 | 0.03 | 2.66 | 1.38 | 4.88 |
|  | $K_2O$ | 3.7 | 4.26 | 4.69 | 4.06 | 4.5 | 5.45 | 3.32 | 1.22 | 3.58 | 2.67 | 6.18 |
|  | $Li_2O$ | 0 | 0 | 0 | 0 | 0 | 0 | 0 | 0 | 0 | 0 | 0 |
|  | MgO | 0.17 | 0.16 | 0.19 | 0.17 | 0.19 | 0.22 | 0.75 | 0.29 | 0.31 | 0.28 | 0.1 |
|  | CaO | 5.81 | 3.77 | 5.46 | 4.34 | 6.34 | 6.97 | 1.1 | 0.22 | 0.57 | 9.29 | 3.37 |
|  | $ZrO_2$ | 0 | 0 | 0 | 0 | 0 | 0 | 0 | 0 | 0 | 0 | 0 |
|  | Others | 24.8 | 0.72 | 1 | 0.76 | 8.42 | 1.12 | 1.38 | 2.04 | 0.58 | 1.38 | 0.57 |

In Tables, the substrate compositions were measured by a glass bead method of a fluorescence X-ray analysis instrument (XRF) after the fired substrate was crushed. Here, the $Li_2O$ amount in the substrate composition was calculated from $Li_2O$ amount in the used raw material (petalite) and the blended amount thereof.

The glaze having the following composition was prepared; then, this was applied onto the sanitary ware substrate and fired at the firing temperature described in Table 2 as the maximum temperature.

$SiO_2$ 56.8 parts by weight
$Al_2O_3$ 8.3 parts by weight
$Fe_2O_3$ 0.1 parts by weight
CaO 10.1 parts by weight
MgO 1.1 parts by weight
ZnO 5.1 parts by weight
$K_2O$ 1.9 parts by weight
$Na_2O$ 1.4 parts by weight
$ZrO_2$ 5.6 parts by weight
Pigment 0.01 parts by weight Physical properties of the sanitary ware obtained by firing are summarized in Table 4 below.

TABLE 4

|  | Example |  |  |  |  |  |  |  |  |  |  |  |
|---|---|---|---|---|---|---|---|---|---|---|---|---|
|  | 1 | 2 | 3 | 4 | 5 | 6 | 7 | 8 | 9 | 10 | 11 | 12 |
| Total amount of alkali metal oxides (wt %) | 7.63 | 8.54 | 7.43 | 7.04 | 7.55 | 7.39 | 6.7 | 6.16 | 8.17 | 7.03 | 8.37 | 5.01 |
| CaO amount (wt %) | 9.22 | 7.24 | 6.5 | 5.22 | 8.39 | 6.62 | 8.58 | 7.5 | 5.81 | 5.81 | 5.81 | 5.39 |
| Minerals contained * Qualitative analysis by XRD — Anorthite | ○ | ○ | ○ | ○ | ○ | ○ | ○ | ○ | ○ | ○ | ○ | ○ |
| Corundum | — | — | ○ | ○ | — | — | — | — | ○ | ○ | — | ○ |
| Mullite | — | — | — | — | — | — | ○ | ○ | — | — | ○ | — |
| Quartz | — | ○ | — | — | ○ | ○ | — | — | ○ | ○ | ○ | ○ |
| Zirconia | — | — | — | — | — | — | — | — | — | — | — | — |
| Zircon | — | — | — | — | — | — | — | — | — | — | — | — |
| Cordierite | — | — | — | — | — | — | — | — | — | — | — | — |
| Anorthite amount (wt %) | 29.4 | — | — | — | — | — | 30.3 | — | — | — | — | — |
| Bulk density (g/cm³) | 1.79 | 1.93 | 1.85 | 2.04 | 1.79 | 1.97 | 1.95 | 2.11 | 1.93 | 2.03 | 1.95 | 2.08 |
| Water absorption rate (%) | 0.31 | 0.14 | 0.34 | 0.11 | 0.4 | 0.2 | 0.16 | 0.11 | 0.3 | 0.04 | 0.2 | 1.44 |
| Closed pore rate (%) | 30.2 | 25.8 | 30.5 | 26.4 | 30.2 | 23.6 | 25 | 19.2 | 27 | 23.7 | 25 | 24.1 |
| Shrinkage rate by firing (%) | 2.2 | 2.1 | 1.5 | 1.99 | 1.8 | 1.9 | 4.7 | 6.5 | 1.5 | 3.2 | 1.9 | 1.7 |
| Deformation amount by softening (mm) | 1.9 | 7.6 | 3.6 | 6.4 | 1.9 | 10 | 2.8 | 5.5 | 5.8 | 13.6 | 6 | 1.14 |
| Flexural strength (Mpa) Rod | — | — | 63 | 73 | — | — | — | — | 69 | — | — | — |
| Rectangular | 55 | 51 | 57 | 69 | 53 | 47 | 53 | 62 | 58 | 67 | 46 | 47.4 |
| Matching with glaze (deformation amount (mm)) | 6.2 | 2.6 | 3.8 | 4.8 | 4.3 | 1.8 | — | — | 1.1 | — | 1.9 | — |
| Thermal shock resistance $\Delta T(°C.)$ | — | 130 | — | — | — | 140 | — | — | 130 | — | 150 | — |

|  | Example |  |  |  |  |  | Comparative Example |  |  |  |  |
|---|---|---|---|---|---|---|---|---|---|---|---|
|  | 13 | 14 | 15 | 16 | 17 | 18 | 1 | 2 | 3 | 4 | 5 |
| Total amount of alkali metal oxides (wt %) | 6.23 | 7.41 | 7.91 | 7.02 | 7.66 | 8.65 | 4.47 | 1.25 | 6.24 | 4.05 | 11.06 |
| CaO amount (wt %) | 5.81 | 3.77 | 5.46 | 4.34 | 6.34 | 6.97 | 1.1 | 0.22 | 0.57 | 9.29 | 3.37 |
| Minerals contained * Qualitative analysis by XRD — Anorthite | ○ | ○ | ○ | ○ | ○ | ○ | — | — | — | ○ | ○ |
| Corundum | — | ○ | — | ○ | — | — | — | — | — | ○ | ○ |
| Mullite | — | — | ○ | — | — | — | ○ | ○ | ○ | — | — |
| Quartz | ○ | ○ | ○ | ○ | ○ | ○ | ○ | ○ | ○ | — | ○ |
| Zirconia | ○ | — | — | — | — | — | — | — | — | — | — |
| Zircon | — | — | — | — | ○ | — | — | — | — | — | — |
| Cordierite | — | — | — | — | — | ○ | — | — | — | — | — |
| Anorthite amount (wt %) | — | 14.1 | — | 15.1 | — | — | — | — | — | — | 12.7 |
| Bulk density (g/cm³) | 2.14 | 2.13 | 1.97 | 2.18 | 2.04 | 1.99 | 2.39 | 1.91 | 2.35 | 1.84 | 3.27 |

TABLE 4-continued

| | | | | | | | | | | | |
|---|---|---|---|---|---|---|---|---|---|---|---|
| Water absorption rate (%) | 0.22 | 0.18 | 0.2 | 0.21 | 0.14 | 0.14 | 0.1 | 13.8 | 0.06 | 16.6 | 0.02 |
| Closed pore rate (%) | 23.2 | 26.9 | 23.9 | 24 | 24.9 | 23.2 | 9.1 | 0 | 12 | 1.8 | 2.3 |
| Shrinkage rate by firing (%) | 1.73 | 2.23 | 2.12 | 1.5 | 1.64 | 2.4 | 9.8 | 2.4 | 12.3 | 1.1 | 7.1 |
| Deformation amount by softening (mm) | 8.1 | 9.7 | 8.4 | 10.7 | 7.7 | 11.3 | 32 | 2.8 | 102 | 0.4 | 155 |
| Flexural strength (Mpa) Rod | — | — | — | — | — | — | 82 | 39 | — | — | — |
| Flexural strength (Mpa) Rectangular | 50.6 | 61.5 | 47.4 | 68 | 50.7 | 44.6 | — | — | 74 | 48 | — |
| Matching with glaze (deformation amount (mm)) | — | — | — | — | — | — | 1.0 | — | — | 2.7 | — |
| Thermal shock resistance $\Delta T(°C.)$ | 120 | — | — | 140 | — | — | 150 | — | — | — | — |

In the table, the total amount of the alkali metal oxides is the total amount of $Li_2O$, $Na_2O$, and $K_2O$ components in the substrate composition in Table 3.

Identification of the minerals contained therein was done as follows. Namely, the fired substrate was crushed; then, the crushed powders thereby obtained were press-molded to a disk-like shape. By using this as the measurement sample, the qualitative analysis thereof was carried out by an X-ray diffraction apparatus (XRD).

Quantification of Anorthite

The anorthite amount the was obtained in such a way that the Rietveld analysis was carried out to the X-ray diffraction pattern obtained by the powder analysis method to determine the scale coefficient, from which the existing amounts of each crystal phase were estimated. Specifically, this was done by the procedure described below.

Here, the pretreatment was done as follows. Namely, the substrate obtained was crushed until the average particle diameter thereof reached 10 µm or less to obtain the powders. In this example, the mortar and pestle made of tungsten carbide (WC) were used for this treatment. There is no restriction in the crushing method; a general crushing tool such as a ball mill or a mortar may be used.

The average particle diameter was measured in accordance with the following procedure.

The water-dispersed body of the substrate powders was prepared by using the ultrasonic dispersion apparatus HYDRO LV (manufactured by Malvern Panalytical Ltd.). The dispersion conditions described below were used.

Dispersant: not used
Frequency: 40 kHz
Irradiation period: 15 seconds
Down-time before start of measurement: 10 seconds
Pump speed: 3500 rpm By using the water-dispersed body thereby obtained, the average particle diameter was measured. For the measurement, the laser diffraction type particle measurement instrument MASTERSIZER 3000 and the software MASTERSIZER ver. 3.72 (both manufactured by Malvern Panalytical Ltd.) were used. With the laser diffraction/scattering method based on the Mie theory, the volume-average value was obtained. The refractive index of the dispersion medium was assumed 1.33.

Next, the X-ray diffraction pattern was obtained by using the powders mentioned above. By using X'Pert (manufactured by Malvern Panalytical Ltd.), the X-ray diffraction pattern was obtained with the X-ray source of CuKα beam (wavelength: $\lambda$=0.15406 nm), the diffraction angle (2θ) of 10 to 60°, and the step size of 0.02°, as the measurement condition. Because it had been known that the larger the obtained X-ray diffraction peak of the crystal phase is, the higher is the accuracy of the quantification, the measurement was done in such a way that the strength of the highest peak in the X-ray diffraction peaks might be 10,000 counts or greater. The X-ray diffraction peak thereby obtained was analyzed by using the software High Score Plus (ver. 4.9).

The crystal phase included in the substrate was identified by selecting the crystal phase that coincided with the PDF (Powder Diffraction File) data of ICDD (International Centre for Diffraction Data) upon comparing the X-ray diffraction pattern obtained under the conditions described above with these data.

With regard to the crystal phase thus identified, the Rietveld analysis was done by the external standard method. $Al_2O_3$ was used as the substance for the outside standard sample. From this outside standard sample, the X-ray diffraction pattern was obtained; then, by comparing with the area of the obtained X-ray diffraction with referring to the COD (Crystallography Open Database) file, the existing amount thereof (% by weight) was calculated to set the standard.

Next, the X-ray diffraction data were obtained in each substrate of Examples and Comparative Examples: then, the diffraction pattern of only the identified crystal phase was quantitatively evaluated with referring to the COD file corresponding to each crystal phase. Because the total amount (% by weight) of the obtained crystal phases did not reach 100%, the amount obtained by subtracting the total amount of the crystal phases from 100% was taken as the quantitative value (% by weight) of the glass phase (amorphous phase).

Among others, the treatment of the background and the treatment of the X-ray diffraction pattern necessary for quantification such as the diffraction peaks by Kα2 and Kβ, smoothing, or the like were done by the software "High Score Plus".

The "water absorption rate" and "closed pore rate" in the tables were measured by the measurement methods described above. Further, "bulk density", "shrinkage rate by firing", "deformation amount by softening", "flexural strength", and "thermal shock resistance" were measured as follows.

Bulk Density

This was measured in accordance with the measurement method of the density and open pore rate of a sintered body of fine ceramics in JIS R1634:1988.

Shrinkage Rate by Firing

The substrate before firing was cut out to the size of 7 mm×8 mm×70 mm to prepare the molded article sample. The length of the center portion of this molded article sample was measured. Next, this sample was fired; then, the length of the center portion of this sample after firing was measured. The shrinkage rate was calculated from the difference of the shrinkage amount.

Deformation Amount by Softening

The test piece of the molded article having the width of 30 mm, the thickness of 10 mm, and the length of 250 mm was fired under the state of this being held with the span of 200 mm. The hang-down amount in the center portion of the test piece after firing was measured to determine the measurement value of the deformation by softening. Because the amount of the deformation by softening is inversely proportional to the square of the thickness, the value converted to the thickness of 10 mm was taken as the deformation amount by softening.

$$\text{Deformation amount by softening} = \text{Measurement value of deformation by softening} \times \frac{(\text{Measurement vale of thickness})^2}{10^2}$$

Flexural Strength

This was measured in accordance with JIS A1509-4: 2014. Specifically, this was measured as follows. The fired body molded to or cut out to the size of 7 mm×8 mm×70 mm was prepared as the rectangular sample. The 3-ponts flexural strength of this sample was measured. The measurement condition with the span of 50 mm and the cross head speed of 0.5 mm/minute was used.

The fired body having the diameter of 14 mm×150 mm was prepared as the rod sample. The 3-ponts flexural strength of this sample was measured. The measurement condition with the span of 100 mm and the cross head speed of 2.5 mm/minute was used.

Matching with Glaze

The substrate raw material of the sanitary ware was molded to prepare the test piece having the size of 20 mm×8 mm×150 mm. A glaze was applied onto one surface of this test piece with the thickness of 0.6 to 0.7 mm; then, this was fired by placing the side of the 8 mm thickness and the 150 mm length (side surface) as the down side. After firing, the warp in the center portion in the non-blazed side thereof was measured with the longitude direction as the standard to obtain the warp amount as the deformation amount.

Thermal Shock Resistance

The fired body having the width of 25 mm, the thickness of 10 mm, and the length of 110 mm was used as the test piece. The test piece was heated to a prescribed temperature, and then, after this was kept at this temperature for 1 hour or longer, this was dropped into water so as to be rapidly cooled; then, the generated crack was confirmed by the ink check. The temperature difference at the rapid cooling (difference between the prescribed heating temperature and the water temperature) was gradually increased; and this operation was repeated until the crack was formed in the test piece. The temperature difference to generate the crack upon rapid cooling in 50% of the samples in number was taken as the thermal shock resistance of the test substrate.

What is claimed is:

1. A sanitary ware comprising
a pottery substrate of a vitreous body and a glaze layer provided on the pottery substrate, wherein a part of the pottery substrate is exposed to outside thereof without the glaze layer;
the pottery substrate comprising:
(A) an anorthite and
(B) an alkali metal component;
where an amount of anorthite in the pottery substrate is in a range of 10 to 45% by weight, an amount of the alkali metal component is in a range of 5 to 10% by weight in terms of an oxide conversion ($A_2O$ where A represents an alkali metal) relative to the pottery substrate, the pottery substrate comprises $SiO_2$ in a range from 40 to 65 parts by weight, $Al_2O_3$ in a range from 20 to 50 parts by weight, CaO in a range from 3 to 10 parts by weight, MgO in a range from 0.1 to 1 parts by weight, $K_2O$ in a range from 3 to 6 parts by weight, $Na_2O$ in a range from 0.5 to 5 parts by weight, $Li_2O$ in a range from 0 to 2 parts by weight,
wherein a water absorption rate of the pottery substrate is less than 2%.

2. The sanitary ware according to claim 1, wherein the pottery substrate further comprises (C) at least one selected from the group consisting of corundum, chamotte, quartz, hollow silica, hollow alumina, zirconia, zircon, cordierite, and mullite.

3. The sanitary ware according to claim 2, wherein the pottery substrate further comprises corundum.

4. The sanitary ware according to claim 1, wherein the glaze layer comprises $SiO_2$ in the range of 55 to 80 parts by weight, $Al_2O_3$ in the range of 5 to 13 parts by weight, $Fe_2O_3$ in the range of 0.1 to 0.4 parts by weight, MgO in the range of 0.8 to 3.0 parts by weight, CaO in the range of 8 to 17 parts by weight, ZnO in the range of 3 to 8 parts by weight, $K_2O$ in the range of 1 to 4 parts by weight, and $Na_2O$ in the range of 0.5 to 2.5 parts by weight.

5. The sanitary ware according to claim 4, wherein the glaze layer further comprises $ZrO_2$ in the range of 0 to 15 parts by weight and a pigment in the range of 0 to 20 parts by weight.

6. The sanitary ware according to claim 1, wherein a closed pore rate in the pottery substrate is 15% or greater by volume.

* * * * *